United States Patent
Nelson

(10) Patent No.: US 9,233,648 B2
(45) Date of Patent: Jan. 12, 2016

(54) BICYCLE RACK

(71) Applicant: Split Oak, Inc., Dallas, TX (US)

(72) Inventor: Tyler Nelson, Greenwich, CT (US)

(73) Assignee: Split Oak, Inc., Dallas, TX (US)

( * ) Notice: Subject to any disclaimer, the term of this patent is extended or adjusted under 35 U.S.C. 154(b) by 0 days.

(21) Appl. No.: 14/266,006

(22) Filed: Apr. 30, 2014

(65) Prior Publication Data

US 2014/0326767 A1 Nov. 6, 2014

Related U.S. Application Data

(60) Provisional application No. 61/818,616, filed on May 2, 2013.

(51) Int. Cl.
| | |
|---|---|
| *B60R 9/10* | (2006.01) |
| *B60R 9/06* | (2006.01) |
| *B62H 3/12* | (2006.01) |
| *B62K 3/04* | (2006.01) |
| *B62K 19/40* | (2006.01) |

(52) U.S. Cl.
CPC ... *B60R 9/10* (2013.01); *B60R 9/06* (2013.01); *B62H 3/12* (2013.01); *B62K 3/04* (2013.01); *B62K 19/40* (2013.01)

(58) Field of Classification Search
CPC .............. B60R 9/10; B60R 9/06; B60R 9/08; B62J 99/00; B62J 2099/0033; B62J 2099/0093; B62J 2099/0053
See application file for complete search history.

(56) References Cited

U.S. PATENT DOCUMENTS

| | | | |
|---|---|---|---|
| 3,670,935 A * | 6/1972 | Hinkston | 224/497 |
| 3,877,622 A | 4/1975 | McLain | |
| 4,050,616 A | 9/1977 | Mosow | |
| 4,298,151 A * | 11/1981 | O'Connor | 224/329 |
| 4,299,341 A | 11/1981 | Copeland et al. | |
| 4,884,728 A | 12/1989 | Temple | |
| 5,197,795 A | 3/1993 | Mudrovich | |
| 5,573,165 A * | 11/1996 | Bloemer et al. | 224/523 |
| 5,730,345 A * | 3/1998 | Yeckley et al. | 224/505 |
| 6,401,999 B1 * | 6/2002 | Hehr | 224/502 |
| 6,602,015 B1 * | 8/2003 | Evans et al. | 403/109.1 |
| 6,722,679 B2 | 4/2004 | Englert | |
| 6,988,645 B1 * | 1/2006 | Nusbaum et al. | 224/519 |
| 2002/0117524 A1 * | 8/2002 | Jeong | 224/314 |
| 2007/0007316 A1 * | 1/2007 | Witczak | 224/310 |
| 2007/0210127 A1 * | 9/2007 | Book et al. | 224/324 |
| 2008/0164292 A1 * | 7/2008 | Farney | 224/324 |
| 2009/0095782 A1 * | 4/2009 | Liu | 224/502 |
| 2011/0068138 A1 * | 3/2011 | Flaherty et al. | 224/324 |
| 2013/0062384 A1 * | 3/2013 | Phillips | 224/500 |
| 2013/0105534 A1 * | 5/2013 | Farber | 224/314 |
| 2013/0277404 A1 * | 10/2013 | Heininger | 224/405 |

* cited by examiner

*Primary Examiner* — Brian D Nash
(74) *Attorney, Agent, or Firm* — Patent Capital Group

(57) ABSTRACT

A bicycle rack used to attach a bicycle to the rear of a motor vehicle. The bicycle rack is fixedly attached to the bicycle when the bicycle is operated as well as when it is transported on the motor vehicle. The bicycle rack includes two swing arms movable from a first position when the bicycle is being utilized to a second transverse position used to attach the bicycle rack and the bicycle to the rear of a motor vehicle. A plurality of retractable cables is used to assist in attaching the bicycle rack and the bicycle to the rear of the vehicle.

19 Claims, 8 Drawing Sheets

BICYCLE RACK

CROSS REFERENCE TO RELATED APPLICATION

This application claims the benefit of U.S. Provisional Patent Application Ser. No. 61/818,616, entitled "BICYCLE RACK," filed May 2, 2013.

BACKGROUND OF THE INVENTION

1. Field of the Invention

This invention relates to a bicycle rack or carrier utilized to attach a bicycle to a vehicle for transporting the bicycle from a first location to a second location. More particularly, the invention relates to a bicycle rack that remains attached to the bicycle at all times allowing the rider to enjoy an unimpeded ride with the added convenience of a portable bicycle rack.

2. Description of the Related Art

Cycling is a very efficient and effective mode of transportation, optimal for short to moderate distances. Bicycles provide numerous benefits compared to motor vehicles, including a means of exercise, an alternative to the use of fossil fuels, reducing air and noise pollution, as well as reducing traffic congestion.

However, there are certain instances in which the cyclist requires transporting the bicycle from a first location to a second location remote from the first location, and does not choose to or cannot ride the bicycle to this second location. For example, this would occur if the cyclist wishes to bring the bicycle on a vacation and therefore must transport the bicycle to the vacation location. Additionally, there are times in which inclement weather would prevent or make it very difficult for the cyclist to ride his or her bicycle.

In these instances, when a vehicle is utilized to transport the bicycle from the first location to the second location, the vehicle must be equipped with a bicycle rack. Generally, the bicycle rack is secured to the top of the vehicle or mounted on the trunk or hatch back door of the vehicle. Unfortunately, the use of either the roof bicycle rack or the rear mounted bicycle rack would create problems. For example, and with respect to the roof bicycle rack, the bicycle must be lifted onto the top of the vehicle, thus inconveniencing the bicycle rider, and possibly scratching the vehicle. When the vehicle is driven with the bicycle on top of the vehicle, the effective height of the vehicle is increased, as well as elevating the center of gravity, thus hindering the safe operation of the vehicle.

With respect to rear mounted bicycle racks, when the bicycle is attached to the rack, the bicycle protrudes from the rear of the vehicle, thereby substantially increasing the effective length of the vehicle. Additionally, while both the roof bicycle rack and the rear mounted bicycle rack can be detached from the vehicle when a bicycle is not being carried by each respective rack, this is generally not done, thereby unnecessarily producing drag on the vehicle as well as, in the case of the rear mounted bicycle rack, potentially shielding the license plate as well as the tail lights from view.

As previously described, conventional bicycle racks are permanently attached to, or removably attached to, the rear or top of a vehicle. Therefore, unless these bicycle racks are attached to the vehicle, the bicycle cannot be transported from the first location to the second location. Consequently, since there are instances when the bicycle rider would unexpectedly be forced to transport the bicycle from the first location to the second location, it is important that a bicycle rack be developed which is physically attached to the bicycle when it is being ridden, and can be affixed to the rear of a vehicle when the bicycle is to be transported between the two locations. For example, if the bicycle becomes inoperable or inclement weather would prevent the bicycle rider from riding the bicycle, any vehicle which would then be utilized to transport the bicycle must be provided with either a roof bicycle rack or a rear mounted bicycle rack. Unless that vehicle is so equipped, it could not transport the bicycle.

SUMMARY OF THE INVENTION

The present invention addresses the deficiencies of the prior art by providing a bicycle rack secured to the bicycle when the bicycle is in use as well as when the bicycle is attached to the rear of a motor vehicle. The bicycle rack of the present invention includes a horizontal member secured to the horizontal long bar of a typical men's bicycle. Two swing arms attach to the horizontal member of the bicycle rack. While the bicycle is being ridden, the two swing arms are secured to the horizontal member of the bicycle rack, such that the two swing arms are in the plane of the bicycle. When the bicycle and the bicycle rack are to be secured to the rear of a vehicle, a locking mechanism associated with each of the swing arms is unlocked, allowing each of the arms to be rotated out of the plane of the bicycle. Each of the swing arms is provided with two pivoting rubber terminal support members adapted to abut the rear of the vehicle when the bicycle rack is attached thereto.

The bicycle rack is provided with two pairs of retractable cables used to firmly secure the bicycle rack to the vehicle. The first pair of retractable cables attaches the bicycle rack within a crack produced at the top of the trunk of the vehicle, when the trunk is opened, and then closed on hooks attached to the ends of each of the cables. The second pair of retractable cables is attached to the cracks created between the bottom of the trunk and the top of the rear bumper through the use of a hook provided at the end of each of these second pair of cables. Alternatively, the hooks provided on the end of each of the second cables are attached to the bottom of the undercarriage of the vehicle.

Additionally, the bicycle rack is provided with a locking mechanism used to prevent the bicycle rack from being removed from the bicycle.

Therefore, an object of the present invention is to provide a bicycle rack secured to the bicycle when the bicycle is in use as well as when the bicycle is being transported by a motor vehicle.

Another object of the present invention is to provide a bicycle rack secured to the horizontal long bar of a bicycle.

Still another object of the present invention is to provide a bicycle rack provided with two swing arms.

A further object of the present invention is to provide a bicycle rack provided with pivoting terminal support members connected to the swing arms.

Yet another object of the present invention is to produce a bicycle rack provided with retractable cables to secure the bicycle rack to the rear of a motor vehicle.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
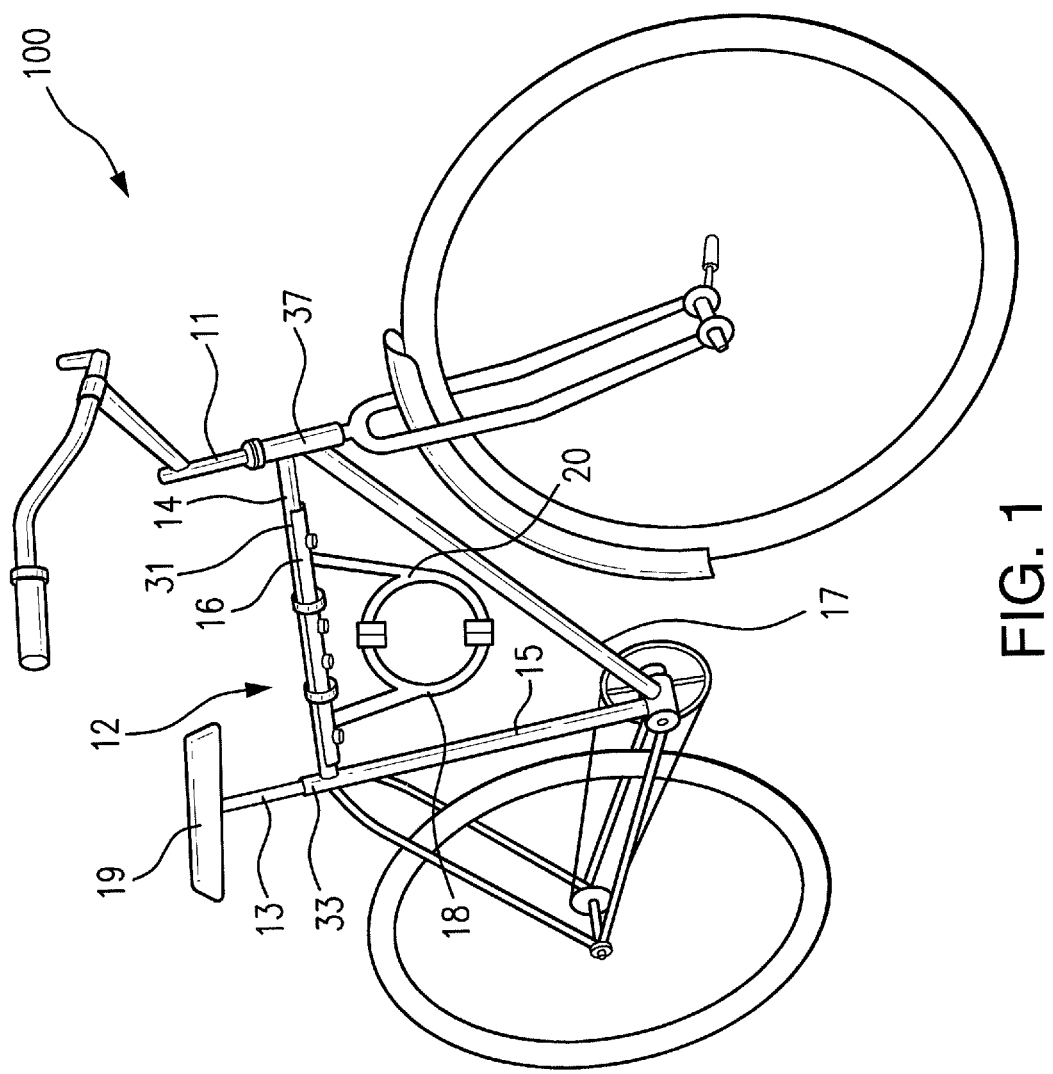
FIG. 1 is a perspective view showing the bicycle rack attached to the bicycle.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Referring to the various figures, a bicycle rack 10 for ready attachment to a vehicle 200 is disclosed. The bicycle rack 10 includes a horizontal member 16 shaped and dimensioned for secure attachment to a horizontal long bar 14 of a bicycle 100. Although, it is appreciated the bicycle rack 10 may be removed from attachment with the bicycle, the present bicycle rack 10 is intended to remain attached to the bike at all times allowing the rider to enjoy an unimpeded ride with the added convenience of being portable. It is the objective of this invention that this bike rack is mounted to the frame of the bike all the times, unlike other bicycle carriers. A first swing arm 18 is rotatably secured to the horizontal member 16 and a second swing arm 20 is rotatably secured to the horizontal member 16. The first swing arm 18 includes an arm 22 and a semicircular arm 24 shaped and dimensioned for engagement with an exterior surface of a vehicle 200 and the second swing arm 20 includes an arm 26 and a semicircular arm 28 shaped and dimensioned for engagement with an exterior surface of the vehicle 200.

Figure 2:
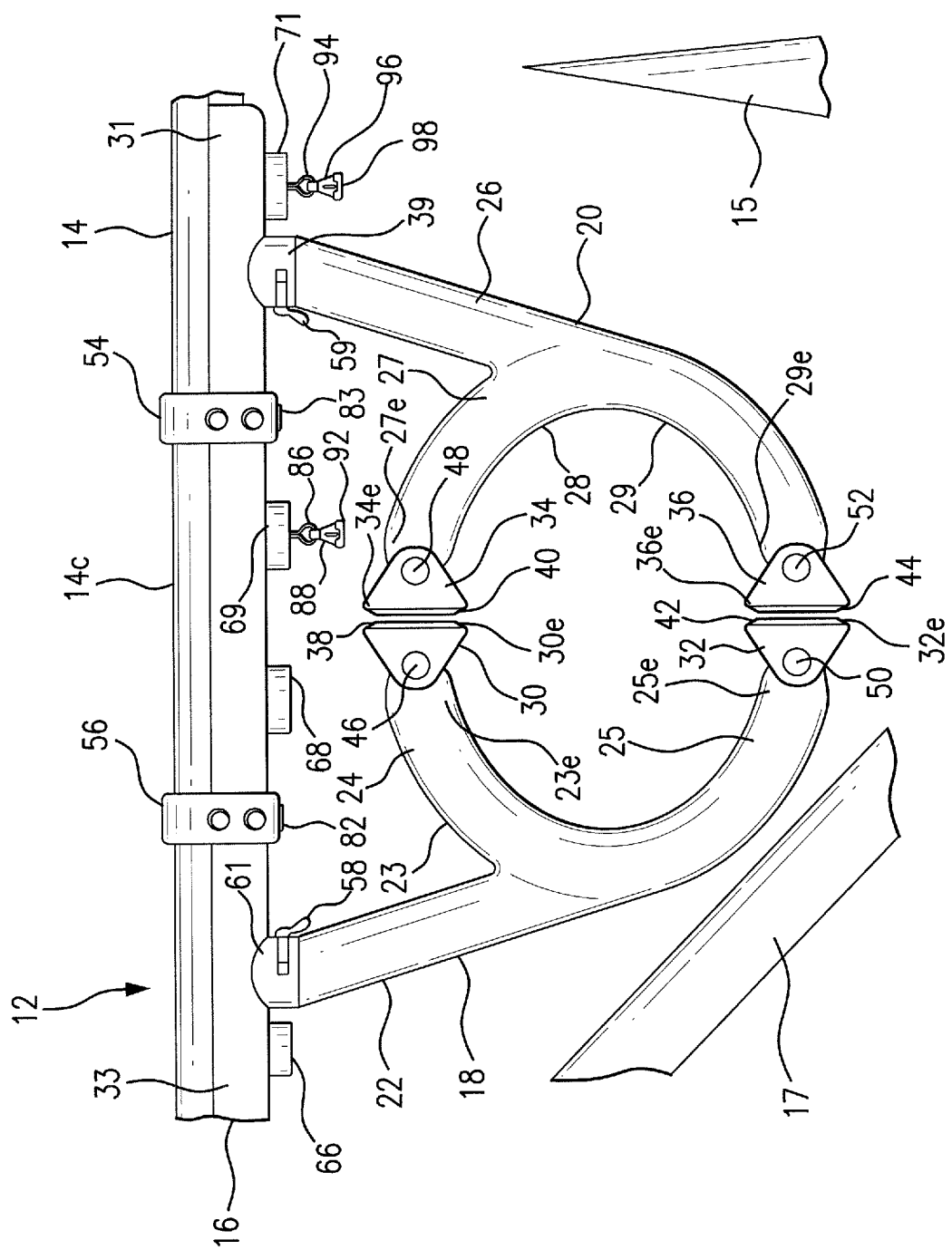
FIG. 2 is a detailed side view of the bicycle rack shown in FIG. 1.

More particularly, FIG. 1 illustrates a bicycle rack 10 attached to a horizontal long bar 14 extending between the handle bars 11 and the support 13 of a bicycle seat 19 of a bicycle 100. As briefly explained above, the bicycle rack 10 is provided with a horizontal member 16 selectively secured to the horizontal long bar 14 by two bands 54, 56 as shown in FIG. 2. The horizontal member 16 is provided with a V-shaped, concave inner surface 16s extending for the entire length of the horizontal member 16, thereby abutting the convex outer surface 14c of the horizontal long bar 14.

The first swing arm 18 is permanently secured to the horizontal member 16 by a cap 61 in the form of a pivoting attachment member including a first locking mechanism 58 in a manner allowing for selective rotation of the first arm relative to the horizontal member 16. The second swing arm 20 is permanently secured to the horizontal member 16 by a cap 39 including a second locking mechanism 59 in a manner allowing for selective rotation of the second swing arm 20 relative to the horizontal member 16. As will be explained below in greater detail, the first and second locking mechanisms 58, 59 are similar in construction and operation (with the exception that they allow for rotation in opposite directions such that the first and second swing arms 18, 20 rotate in manner similar to that of a double door). The first swing arm 18 is attached to the horizontal member 16 in proximity to a first end 33 of the horizontal member 16. The second swing arm 20 is attached in proximity to a second end 31 of the horizontal member 16.

A first locking device 82 secures the first band 56 around both the horizontal member 16 and the horizontal long bar 14 to ensure secure and tamperproof attachment thereto. A second locking device 83 secures the second band 54 around both the horizontal member 16 and the horizontal long bar 14 to also ensure secure and tamperproof attachment thereto. The first and second bands 54, 56 are provided between the first and second swing arms 18, 20.

Each of the first and second swing arms 18, 20 is angled toward the other swing arm as they each extend downwardly from the horizontal member 16. The first swing arm 18 is comprised of an arm 22 and a semicircular arm 24 composed of arc segments 23, 25 as shown in FIG. 2. The arm 22 is secured between the horizontal member 16 and the semicircular arm 24. A terminal support member 30 is attached to the end 23e of the arc segment 23 by a pivotal connector 46. Similarly, a terminal support member 32 is connected to the end 25e of arc segment 25 through the use of a pivotal connector 50. The end 30e of the terminal support member 30 is provided with a rubberized or similar non-abrasive end surface 38. Additionally, the end 32e of the terminal support member 32 is provided with a rubberized or similar non-abrasive end surface 42.

The second swing arm 20 includes an arm 26 and a semicircular arm 28 including arc segments 27 and 29. The arm 26 extends from the horizontal member 16 and is positioned between the horizontal member 16 and the semicircular arm 28. A terminal support member 34 is attached to the end 27e of the arc segment 27 by a pivotal connector 48. A rubberized or similar non-abrasive end surface 40 is attached to end 34e of the terminal support member 34. Similarly, a terminal support member 36 is attached by a pivotal connector 52 to the end 29e of the arc segment 29. A rubberized or similar non-abrasive end surface 44 is applied to the end 36e of the terminal support 36.

Figure 8:
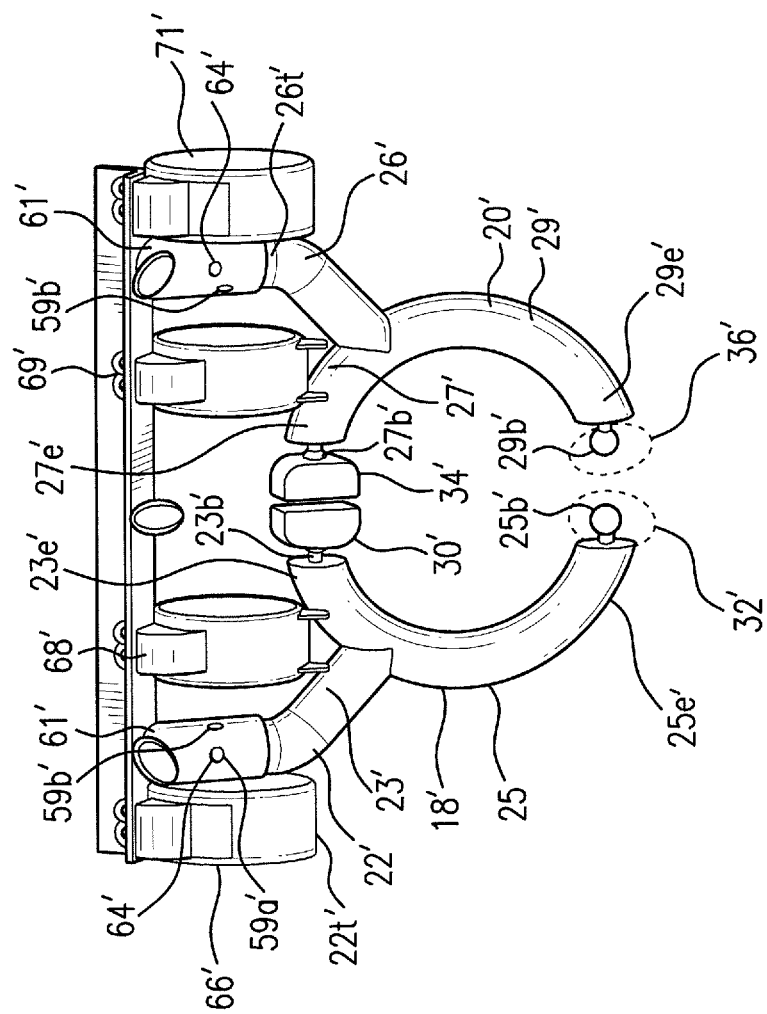
FIG. 8 is a perspective view of a bicycle rack in accordance with an alternate embodiment of the present invention with terminal support members removed to show the structure of the ball joints.

In accordance with an alternate embodiment, and as shown with reference to FIG. 8, the bicycle rack 10' is provided with terminal support members 30', 32', 34', 36' connected to the ends 23e', 25e', 27e', 29c' of the arc segments 23', 25', 27', 29' with ball and socket joints 23b', 25b', 27b', 29b'. These terminal support members are provided with integral end surfaces 38', 40', 42', 44' composed of tough rubber pads. These ball and socket joints allow for a full range of motion.

As shown in FIGS. 1 and 2, when the bicycle rack 10 is not attached to the rear 202 of a vehicle 200, the first and second swing arms 18, 20 are provided in the same plane as the bicycle frame 12. This plane comprises horizontal long bar 14, a substantially vertical bar 15 extending from one end of the horizontal long bar 16 and an angled bar 17. The vertical bar 15 extends between the horizontal long bar 14 and the angled bar 17. The angled bar 17 extends between a short bar 37 extending from the handlebars 11 and the bottom end of the vertical bar 15. When the bicycle rack 10 is in this position, arc segments 23, 25, 27, and 29 are configured in a circular arrangement.

Figure 3:
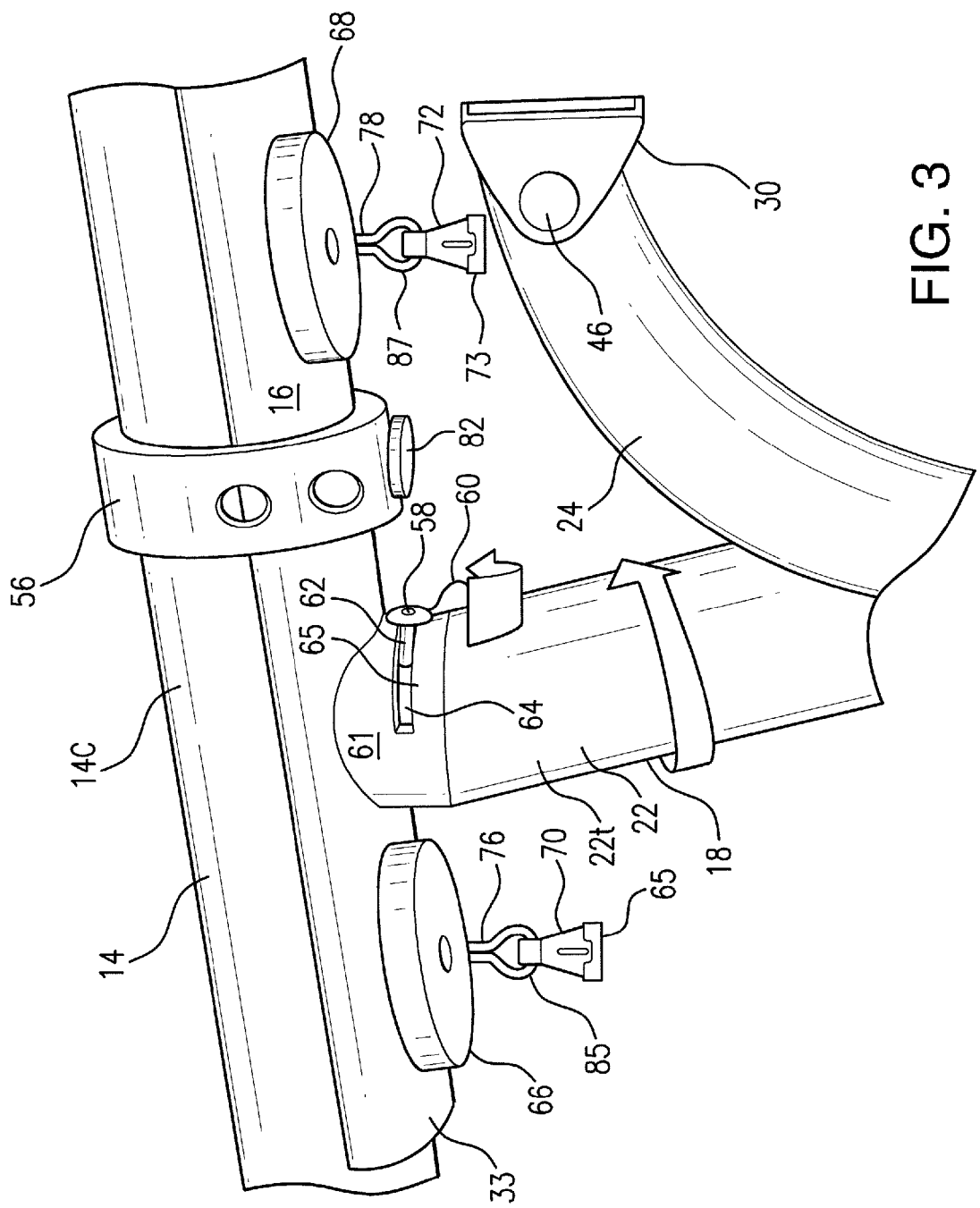
FIGS. 3 and 4 are detailed side views showing the manner in which the bicycle rack moves from a stored position into an active position.
Figure 4:
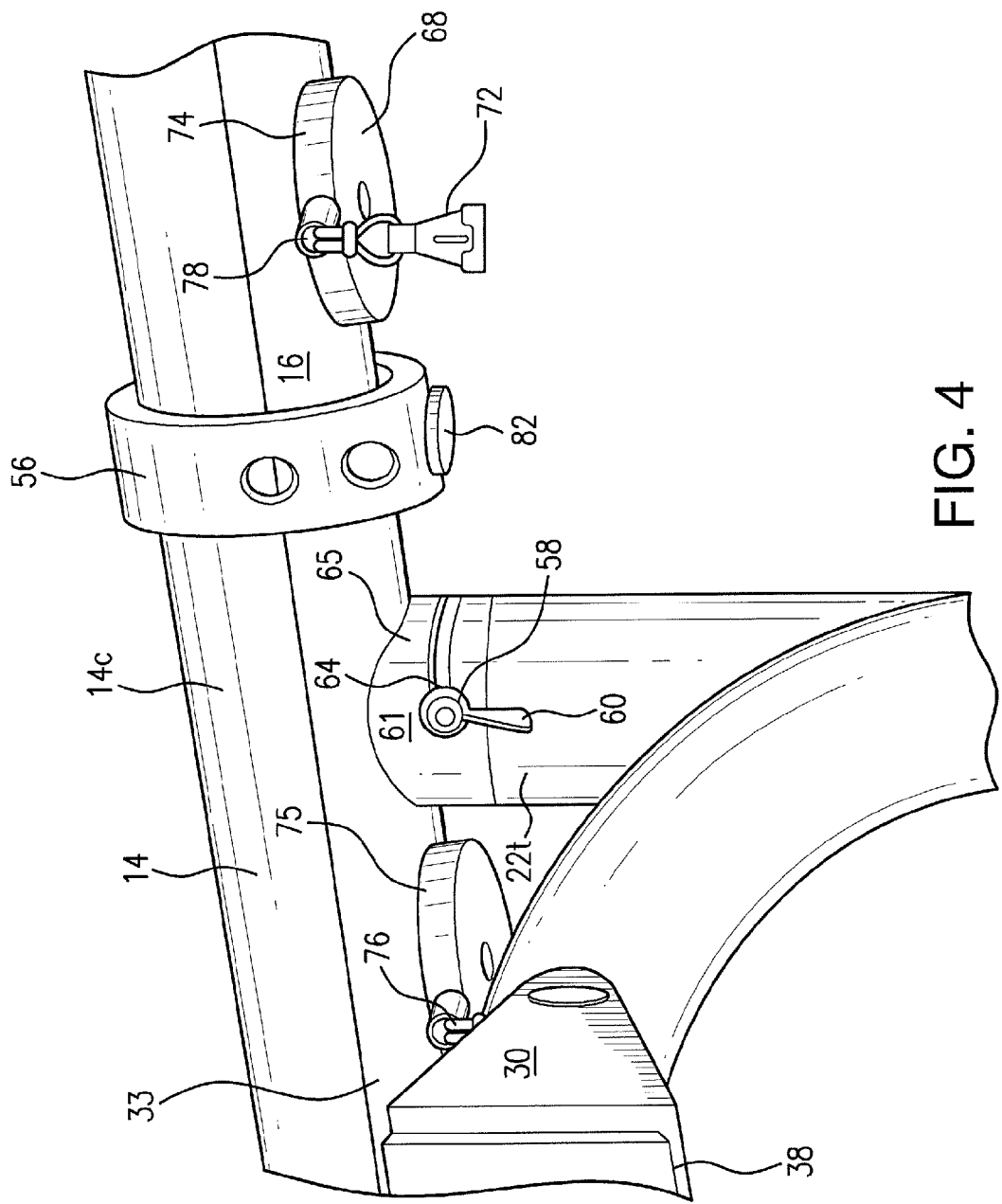
Figure 5:
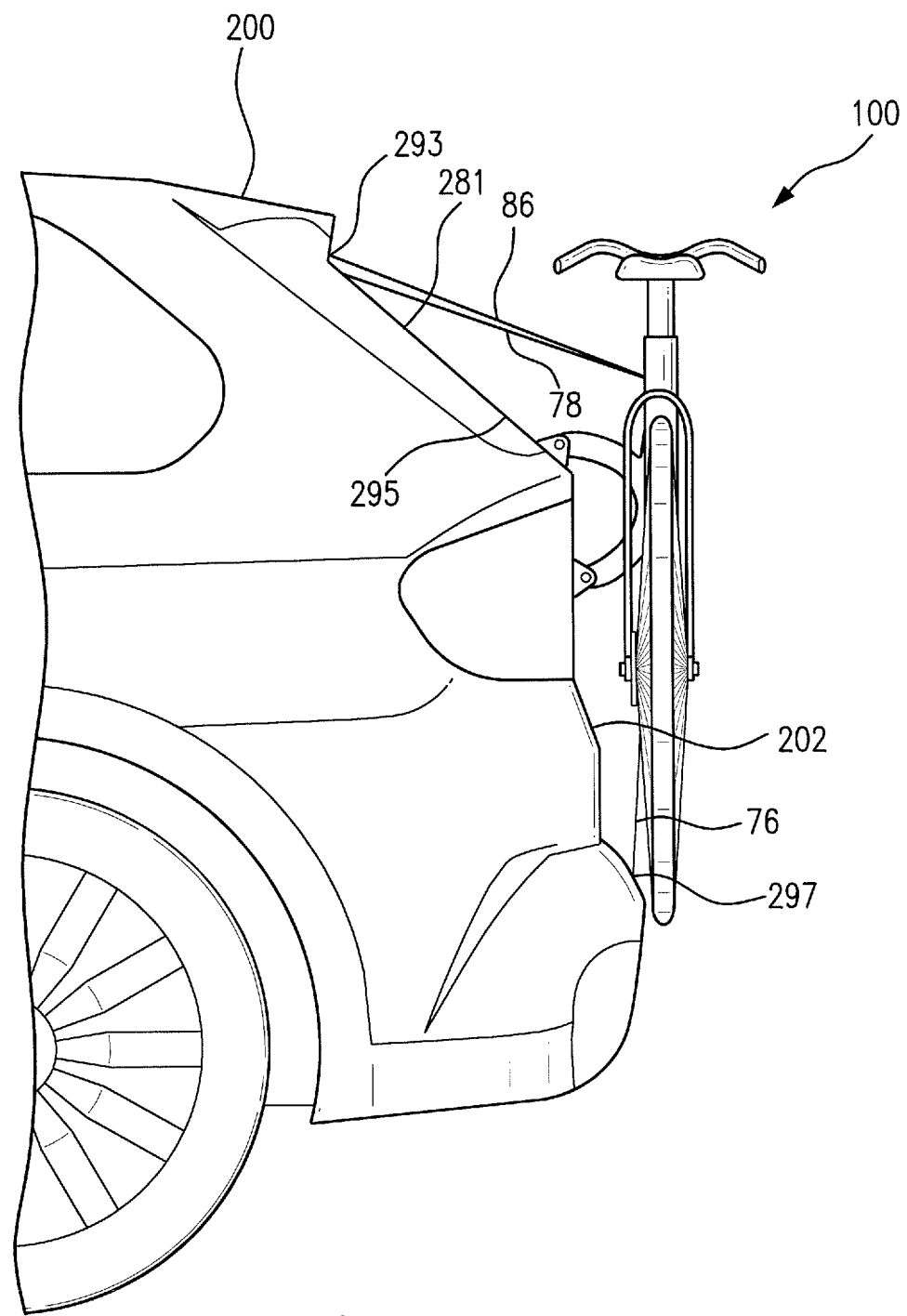
FIG. 5 is a side view showing the bicycle attached to a vehicle utilizing the bicycle rack of the present invention.
Figure 6:
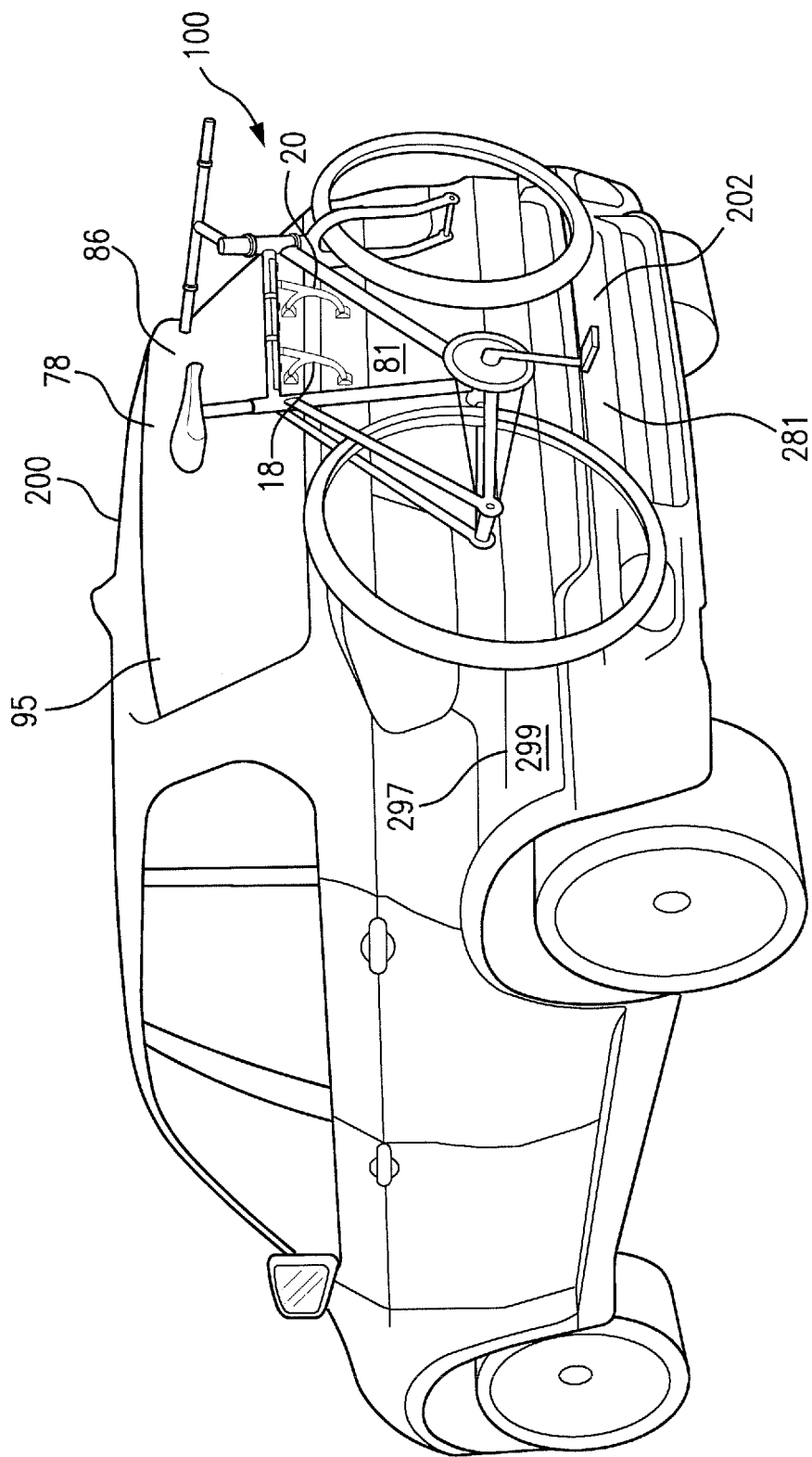
FIG. 6 is a perspective view showing the bicycle and bicycle rack attached to the rear of a motor vehicle.
Figure 7:
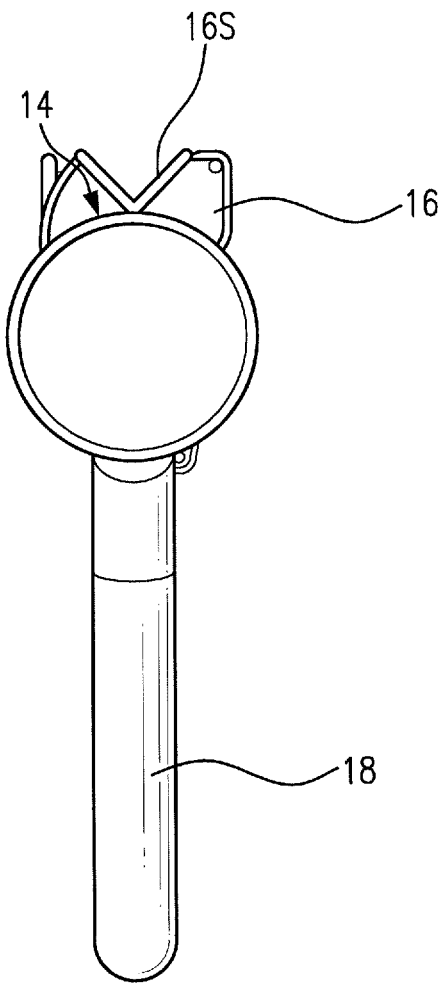
FIG. 7 is a side view of the bicycle rack detached from a bicycle.

FIGS. 3 and 4 illustrate the manner in which the bicycle rack 10 is readied for affixing to the rear 202 of a vehicle 200 as shown in FIGS. 5 and 6. Although FIGS. 3 and 4 illustrate the manner in which the first swing arm 18 is rotated approximately 90 degrees from the position shown in FIG. 1 to the position shown in FIGS. 5 and 6, it is appreciated that second swing arm 20 is maneuvered in a mirror image manner to affix the bicycle 100 utilizing the bicycle rack 10 to a motor vehicle 200. As mentioned above, the cap 61 pivotally securing the first swing arm 18 to the horizontal member 16 includes a frictional locking mechanism 58. It is appreciated the cap 61 shaped and dimensioned to receive the top 22t of arm 22, proximate to where the arm 22 is secured to the horizontal member 16. This allows the arm 22 to rotate relative to the cap 61 as the top 22t sits within the cap 61. The frictional locking mechanism 58 includes a shaft 62 provided within a slot 64 in the cap 61 and screwed into the top 22t of the arm 22. In the locked position, the shaft 62 abuts the cap 61 at a first end 64f of the slot 64 thereby preventing rotation of the arm 22 relative to the cap 61. When the frictional locking mechanism 58, utilizing handle 60, is turned in the counterclockwise direction, the end of the shaft 62 moves in an outward direction and becomes disengaged from the exterior surface 65 of the cap 61, allowing the swing arm 18 to rotate approximately 90 degrees to the position shown in FIG. 4. As the swing arm 18 rotates to the position shown in FIG. 4, the shaft 62 of the frictional locking mechanism 58 moves in the slot 64 to the position shown in FIG. 4 at the second end 64s of the slot 64. The handle 60 is then rotated in the clockwise direction, thereby forcing the end of the shaft 62 inwardly against the exterior surface 65 of the cap 61, resulting in the arm 22 being secured in the position shown in FIG. 4. In accordance with an alternate embodiment, and with reference to FIG. 8, it is appreciated the friction locking mechanism may take the form of a spring loaded push button mechanism 58' allowing the swing arms 18', 20' to rotate 90 degrees from a stowed position to an operational position. More particularly, two spring-loaded push buttons 59a', 59b' are provided in the top 22t', 26t' of the arm 22', 26' each swing arm 18', 20'. The spring loaded push buttons 59a', 59b' are mounted at 90-degree angles to one another. One of the push buttons 59a' will remain in a hole 64' piloted in the cap 61 in which the top 22t, 26t of the swing arm 18, 20 is positioned arresting any vertical or rotational motion of the swing arm 18, 20 while the other push button 59b' (shown in phantom lines) is hidden inside the cap 61. When the user would like to change the position of the swing arms 18', 20' they simply push in the buttons 59a' on each one of the swing arms 18, 20 and rotate the arm until the push button 59b' at 90 degrees to the first springs into the hole 64' in the cap 61', locking the swing arm 18', 20' in place.

At this point, both the end surfaces 38, 42 of the terminal support members 30, 32 respectively would be in position to be secured to the trunk 281 of the motor vehicle 200. Since the angle of the exterior surface of various motor vehicles are different, pivotal connectors 46, 50 are used to the terminal support members 30, 32 to the ends 23e, 25e of the arc segments 23, 25 to allow the terminal support members 30, 32 to pivot in order to abut the exterior surface of the rear of any motor vehicle. Although FIGS. 3 and 4 only show the manner in which the first swing arm 18 moves from one locked position to a second locked position, it can be appreciated that the second swing arm 20 would move in a like manner between the two locked positions.

As illustrated in FIGS. 2-4, a first reel 66, a second reel 68, a third reel 69 and a fourth reel 71 are affixed to the underside of the horizontal member 16. The second and third reels 68, 69 are provided between the first and second swing arms 18, 20. The first reel 66 is provided close to the first end 33 of the horizontal member 16, and the fourth reel 71 is provided close to the second end 31 of horizontal member 16.

As shown in FIGS. 3 and 4, the first reel 66 is provided with a cable 76 wound within the reel 66 when the bicycle rack 10 is not attached to the motor vehicle 200. The end 85 of the cable 76 extends from a housing 75 attached to the first reel 66, allowing the cable 76 be wound or unwound from the first reel 66. The end 85 of the cable 76 is encircled by a pull tab 70 provided with a hook 77 at its bottom end. Similarly, the second reel 68 is provided with a cable 78 having an end 87 extending from a housing 74 attached to the second reel 68, allowing the cable 78 to be wound or unwound from the second reel 68. A top end of a pull tab 72 encircles the end 87 of the cable 78. A hook 73 extends from the bottom of the pull tab 72. It is appreciated the term cable may refer to a variety of elongated structures. For example, the cables may be retractable nylon straps. Still further, and in accordance with a preferred embodiment, as shown with reference to FIG. 8, the reels 66, 68, 69, 71, used in accordance with the present invention, may be nylon strap spools with built in CAM lock mechanisms to grip the straps and keep the bicycle firmly attached to the car.

Although not shown in detail, the third and fourth reels 69, 71 are similar in configuration and operation to the first and second reels 66, 68. For example, a cable 86 extending from the third reel 69 is provided with a pull tab 88 having a hook 92 at its bottom end. Additionally, a cable 94 extending from the fourth reel 71 is provided with a pull tab 96 having a hook 98 at its bottom end.

Once the bicycle rack 10 is placed in position shown in FIGS. 5 and 6, with the first swing arms 18 and the second swing arm 20 swung 90 degrees from the position shown in FIG. 2, the cables 78, 86 provided within the second and third reels 68, 69 are extended to attach within a crack 293 created at the top of the trunk hatch 295 and the body of the vehicle 200, when the trunk hatch 295 is opened. Hook 73 extending from the end of cable 78 of the second reel 68, and a similar hook 92 extending from the end of the cable 86 of reel 69, are secured within this crack 293 when the trunk hatch 295 is closed.

Similarly, when cables 76 and 94 are unwound from the first reel 66 and the fourth reels 71, hook 77 provided at the end of the cable 76 and hook 98 provided at the end of cable 94 are secured within a crack 297 created between the bottom of the trunk hatch 295 and the top of the rear bumper 299, when the trunk hatch 295 has been closed. Alternatively, hook 77 attached to the end of the cable 76 and a similar hook 98 attached to the end of the cable 94 are secured to the undercarriage of the vehicle. It is noted that all of the cables provided in the first, second, third and fourth reels 66, 68, 69, 71 would be biased in a direction which would automatically allow the cables to be retracted into each respective reel when the cables are removed from their attachment to the vehicle.

Once the bicycle rack 10 attaches the bicycle 100 to the vehicle 200 as shown in FIGS. 5 and 6, the bicycle 100 can then be transported to a remote location. When the vehicle 200 reaches the remote location, the trunk hatch 295 is opened, and the four cables 76, 78, 86 and 94 are disengaged from the top and bottom of the trunk hatch 295, or the undercarriage of the vehicle. The cables are then retracted into the four reels 66, 68, 69, 71. The friction locks, such as frictional locking mechanism 58, 59 on the first and second swing arms 18, 20 are loosened and the first and second swing arms 18, 20 are swung to the position shown in FIGS. 1 and 2, at which time the swing arms 18, 20 are then locked into position.

The first and second bands 54, 56 are provided with various lock mechanisms known in the art to prevent the bicycle rack 10 from being removed from the bicycle 100 for the purpose of preventing theft of the bicycle rack 10. In addition, it is noted that since the bicycle rack 10 is intended to be attached to the bicycle 100 while the rider is riding the bicycle, the two swing arms 18, 20 as well as the horizontal member 16 should be constructed from a lightweight but sturdy plastic material.

With the present bicycle rack, the responsibility of having a bicycle rack is taken from a motorist who might be transporting the cyclist and his/her bicycle, and instead rests it duly on the cyclist. This present bicycle rack affords a cyclist the opportunity to ride freely to destinations of their choosing knowing that they are not obligated to make the return trip. For example, a cyclist might choose to ride a certain distance and stop for dinner. Darkness falls while she/he eats, but instead of having to subject him/her to a potentially hazardous night ride, she/he may simply call a cab and attach the bicycle to the rear of the cab. Additionally, if plans are changed, a cyclist is free to hitch rides as she/he sees fit while maintaining possession of the bicycle.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A bicycle rack, comprising:
a horizontal member attached to a horizontal long bar of a bicycle;
a plurality of swing arms pivotally secured to the horizontal member, wherein each of the plurality of swing arms are coupled to the bicycle when the bicycle is being ridden by a user on a surface, wherein at least one of the plurality of swing arms includes an arm and a semicircular arm.

2. The bicycle rack according to claim 1, further including first and second bands for securing the horizontal member to the horizontal long bar.

3. The bicycle rack according to claim 1, wherein the horizontal member includes a concave inner surface for abutting with a convex outer surface of the horizontal long bar.

4. The bicycle rack according to claim 1, wherein at least one of the plurality of swing arms includes a cap, the cap including a locking mechanism to pivotally secure the at least one of the plurality of swing arms to the horizontal member.

5. The bicycle rack according to claim 1, wherein a first swing arm is attached to the horizontal member in proximity to a first end of the horizontal member and a second swing arm is attached to the horizontal member in proximity to a second end of the horizontal member.

6. The bicycle rack according to claim 5, where the first and second swing arms are angled toward each other as they extend downwardly from the horizontal member.

7. The bicycle rack according to claim 1, wherein each of the plurality of swing arms includes a first arc segment and a second arc segment.

8. The bicycle rack according to claim 7, wherein a terminal support member is secured to an end of each of the first arc segment and the second arc segment.

9. The bicycle rack according to claim 1, further including at least one reel affixed to the horizontal member.

10. The bicycle rack according to claim 9, wherein first, second, third and fourth reels are affixed to the horizontal member.

11. A bicycle including an integrated bicycle rack, comprising:
a bicycle having a bicycle frame with a long horizontal bar;
a bicycle rack attached the long horizontal bar, the bicycle rack including:
a horizontal member securely attached to the horizontal long bar of the bicycle;
a plurality of swing arms pivotally secured to the horizontal member, wherein each of the plurality of swing arms are coupled to the bicycle when the bicycle is being ridden by a user on a surface, wherein at least one of the plurality of swing arms includes an arm and a semicircular arm.

12. The bicycle including an integrated bicycle rack according to claim 11, wherein the horizontal member includes a concave inner surface for abutting with a convex outer surface of the horizontal long bar.

13. The bicycle including an integrated bicycle rack according to claim 11, wherein at least one of the plurality of swing arms includes a cap, the cap including a locking mechanism to pivotally secure the at least one of the plurality of swing arms to the horizontal member.

14. The bicycle including an integrated bicycle rack according to claim 11, wherein a first swing arm is attached to the horizontal member in proximity to a first end of the horizontal member and a second swing arm is attached to the horizontal member in proximity to a second end of the horizontal member.

15. The bicycle including an integrated bicycle rack according to claim 14, where the first and second swing arms are angled toward each other as they extend downwardly from the horizontal member.

16. The bicycle including an integrated bicycle rack according to claim 11, wherein each of the plurality of swing arms includes a first arc segment and a second arc segment.

17. The bicycle including an integrated bicycle rack according to claim 16, wherein a terminal support member is secured to an end of each of the first arc segment and the second arc segment.

18. The bicycle including an integrated bicycle rack according to claim 11, further including at least one reel affixed to the horizontal member.

19. The bicycle including an integrated bicycle rack according to claim 18, wherein first, second, third and fourth reels are affixed to the horizontal member.

* * * * *